United States Patent
Bozovic et al.

(10) Patent No.: US 11,242,902 B2
(45) Date of Patent: Feb. 8, 2022

(54) BRAKE DISC AND METHOD FOR PRODUCING A BRAKE DISC

(71) Applicant: Robert Bosch GmbH, Stuttgart (DE)

(72) Inventors: Ilija Bozovic, Karlsruhe (DE); Roland Raab, Wiesloch (DE); Laurent Le Barzic, Strasbourg (FR)

(73) Assignee: Robert Bosch GmbH, Stuttgart (DE)

(*) Notice: Subject to any disclaimer, the term of this patent is extended or adjusted under 35 U.S.C. 154(b) by 87 days.

(21) Appl. No.: 16/631,212

(22) PCT Filed: Aug. 2, 2018

(86) PCT No.: PCT/EP2018/070972
§ 371 (c)(1),
(2) Date: Jan. 15, 2020

(87) PCT Pub. No.: WO2019/025529
PCT Pub. Date: Feb. 7, 2019

(65) Prior Publication Data
US 2020/0141460 A1    May 7, 2020

(30) Foreign Application Priority Data

Aug. 2, 2017 (DE) .................. 10 2017 213 372.4
Aug. 1, 2018 (DE) .................. 10 2018 212 862.6

(51) Int. Cl.
*F16D 65/12* (2006.01)
*F16D 65/02* (2006.01)

(52) U.S. Cl.
CPC ......... *F16D 65/123* (2013.01); *F16D 65/125* (2013.01); *F16D 65/128* (2013.01);
(Continued)

(58) Field of Classification Search
CPC . F16D 65/10; F16D 65/12; F16D 65/123–128
(Continued)

(56) References Cited

U.S. PATENT DOCUMENTS 4,630,463 A * 12/1986 Knowlton ................ B21J 15/02
29/509
6,298,543 B1 * 10/2001 Shore ...................... B21J 15/02
29/243.53
(Continued)

FOREIGN PATENT DOCUMENTS

DE    100 32 972 A1    1/2002
DE    102 17 616 A1    11/2003
(Continued)

OTHER PUBLICATIONS

International Search Report corresponding to PCT Application No. PCT/EP2018/070972, dated Nov. 20, 2018 (German and English language document) (6 pages).

*Primary Examiner* — Christopher P Schwartz
(74) *Attorney, Agent, or Firm* — Maginot, Moore & Beck LLP

(57) ABSTRACT

A brake disc includes a friction ring having a first material and a brake rotor hat having a second material that is different from the first material. The friction ring includes a flange formed in the axial direction, and the flange is connected to an edge of the brake rotor hat oriented towards the friction ring, by means of at least one connection element designed as a rivet. The rivet head is in flat contact with the surface of the brake rotor hat facing away from the flange.

18 Claims, 4 Drawing Sheets

(52) U.S. Cl.
CPC ............... *F16D 2065/1328* (2013.01); *F16D 2065/1344* (2013.01); *F16D 2065/1392* (2013.01); *F16D 2200/003* (2013.01); *F16D 2200/0013* (2013.01); *F16D 2250/0061* (2013.01); *F16D 2250/0084* (2013.01)

(58) Field of Classification Search
USPC ....................... 188/17, 18 A, 218 A, 218 XL
See application file for complete search history.

(56) References Cited

U.S. PATENT DOCUMENTS

| | | | | |
|---|---|---|---|---|
| 2016/0160948 | A1* | 6/2016 | Wagner | ................. F16D 65/127 188/218 XL |
| 2018/0306259 | A1* | 10/2018 | Kokott | .................. F16D 65/123 |
| 2020/0208694 | A1* | 7/2020 | Bozovic | .............. B60B 27/0052 |

FOREIGN PATENT DOCUMENTS

| | | |
|---|---|---|
| DE | 100 32 972 B4 | 4/2004 |
| DE | 20 2005 013 569 U1 | 1/2006 |
| DE | 10 2007 018 655 A1 | 10/2008 |
| DE | 10 2008 018 326 A1 | 10/2009 |
| DE | 10 2009 021 852 A1 | 11/2010 |
| DE | 10 2013 215 997 A1 | 2/2015 |
| DE | 10 2015 226 450 A1 | 6/2017 |
| GB | 1 068 287 A | 5/1967 |
| JP | S56-139690 A | 10/1981 |
| JP | S58-44513 U | 3/1983 |

\* cited by examiner

BRAKE DISC AND METHOD FOR PRODUCING A BRAKE DISC

This application is a 35 U.S.C. § 371 National Stage Application of PCT/EP2018/070972, filed on Aug. 2, 2018, which claims the benefit of priority to Serial Nos. DE 10 2017 213 372.4, filed on Aug. 2, 2017, and DE 10 2018 212 862.6, filed on Aug. 1, 2018, both filed in Germany, the disclosures of which are incorporated herein by reference in their entirety.

The present disclosure relates to a brake disk and to a method for producing a brake disk having the features described herein.

BACKGROUND

It is the function of brake disks to transmit the braking torque to the axle when the vehicle is being decelerated and to briefly store the kinetic energy which arises during braking in the form of heat and then to release this heat again by conduction, radiation and convection.

In the prior art, brake disks are usually produced in one piece from gray cast iron containing flake graphite.

In the context of lightweight construction, brake disks are being replaced by materials other than gray cast iron, in general lighter materials, especially in the region of the brake pot. A sheet-metal pot may be mentioned here by way of example. The brake pot can likewise be replaced by an aluminum pot. In this regard, DE 100 32 972 B4 may be mentioned by way of example. Here, there is a description of a composite brake disk for a vehicle which has a friction ring made from cast material and which is secured on a brake disk pot consisting of a different material. The friction ring is now connected by connecting elements to the brake pot by means of a joint between the friction ring and the brake disk pot.

SUMMARY

The disclosure starts from a brake disk having
a friction ring consisting at least partially of a first material,
a brake pot consisting at least partially of a second material that is different from the first material, wherein
the friction ring has a collar formed in the axial direction, and
the collar is connected to a rim, which is oriented toward the friction ring, of the brake pot by means of at least one connecting element designed as a rivet.

In the disclosed brake disk, the rivet head rests flatly against that surface of the brake pot which faces away from the collar.

In order to achieve a stable mechanical connection between the collar of the friction ring and the brake pot, a good mechanical connection is necessary between the connecting element and the brake pot and/or collar. This could be achieved by means of recesses in the region of the connecting element, for example. However, the material of a brake pot of lightweight construction generally has a thickness of only about 2.5 mm to 2.8 mm. For this reason, a recess in the region of a connecting element would lead to a further reduction in the material, which is already very thin in any case. The disclosed brake disk solves this problem in that the rivet head rests flatly against that surface of the brake pot or of the rim of the brake pot which faces away from the collar. This results in a very stable mechanical connection between the collar of the friction ring and the brake pot.

It is particularly advantageous that the brake pot consists at least partially of light metal, in particular aluminum. It is likewise possible for the brake pot to consist at least partially of metal, in particular sheet metal.

The friction ring can consist of gray cast iron.

In an advantageous embodiment of the brake disk, it is envisaged that the collar is designed so as to be formed integrally on the friction ring.

In particular, the disclosure also relates to a method for producing the brake disk. Here, the method according to the disclosure also starts from:
a friction ring which consists at least partially of a first material and has a collar formed in the axial direction, and
a brake pot consisting at least partially of a second material that is different from the first material.

According to the disclosure, the following steps are provided:
making available the at least one friction ring,
making available the brake pot,
connecting the collar to a rim, which is oriented towards the friction ring, of the brake pot by means of at least one connecting element designed as a rivet, wherein the connection takes place such that the rivet head is at least temporarily subjected to a greater force, acting substantially perpendicularly to the rivet, at its rim than in its center.

By means of the force distributed in accordance with the disclosure on the rivet head, a deformation occurs such that the rivet head rests substantially flatly against that surface of the brake pot which faces away from the collar.

It is particularly advantageous that the connection takes place by means of a tool with a rounded surface, wherein the rounded surface is brought into contact with the rivet head in such a way that the rivet head is subjected to a greater substantially perpendicularly acting force at its rim than in its center.

Further advantageous embodiments of the disclosure are disclosed herein and in the illustrative embodiment.

BRIEF DESCRIPTION OF THE DRAWINGS

Illustrative embodiments of the disclosure are explained below with reference to drawings.

DETAILED DESCRIPTION

Figure 1:
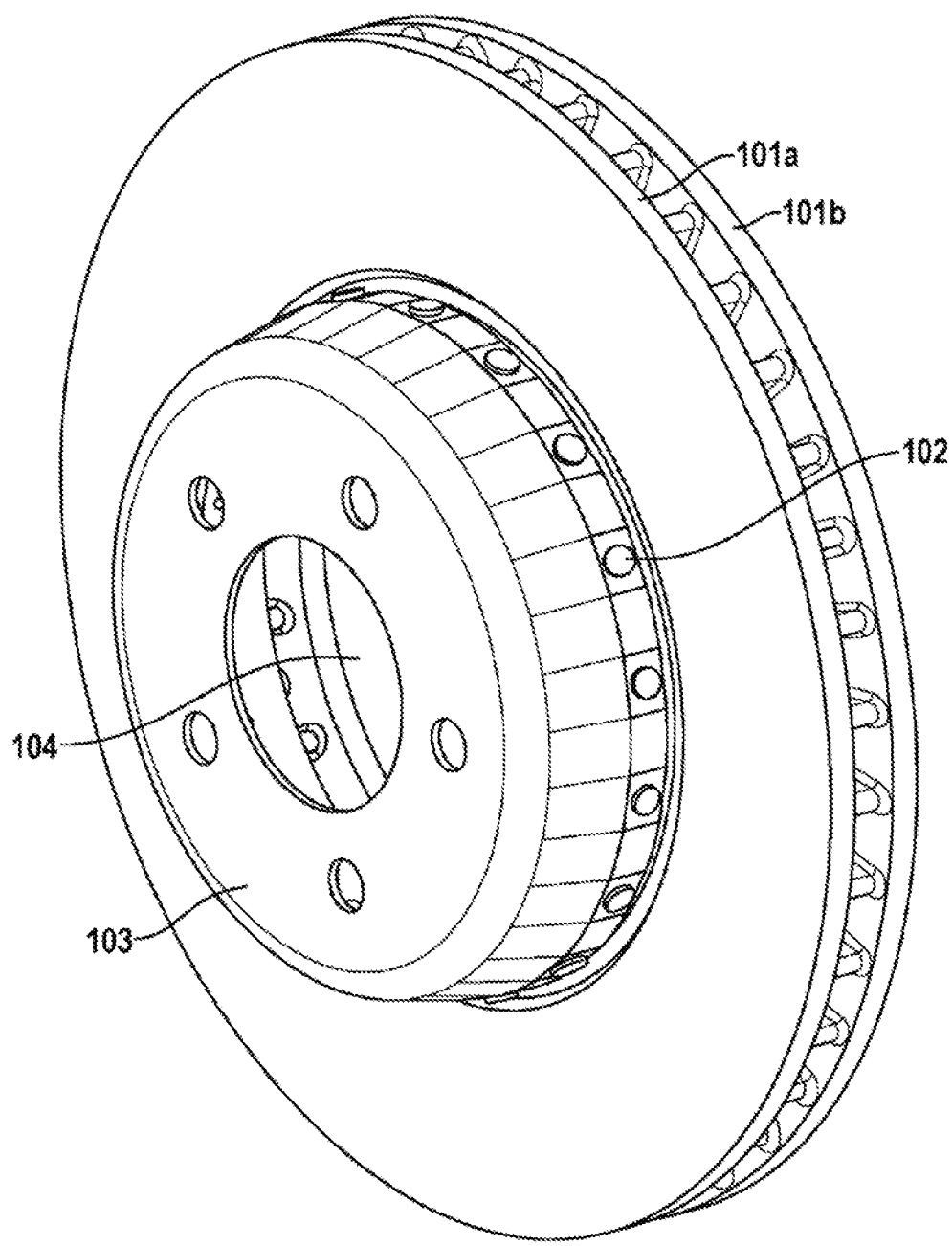
FIG. 1 shows a fully assembled brake disk of lightweight construction according to the disclosure.

The brake disk illustrated in FIG. 1 has two brake rings 101a and 101b in the form of annular disks, which are connected to spacer elements. The brake disk illustrated is internally ventilated and its brake ring is double-walled. Outer faces of the brake ring form friction surfaces 101a and 101b, in the form of annular disks, of the brake disk. The friction surfaces are the surfaces of the brake disk against which friction brake pads (not illustrated) are pressed during braking in order to brake the brake disk by friction. In this illustrative embodiment, the brake disk consists of gray cast iron or of a steel alloy. In the center, the brake disk has an aperture 104.

Reference sign 103 indicates the brake pot, which is connected to the brake disk by means of the connecting elements 102.

Figure 2:
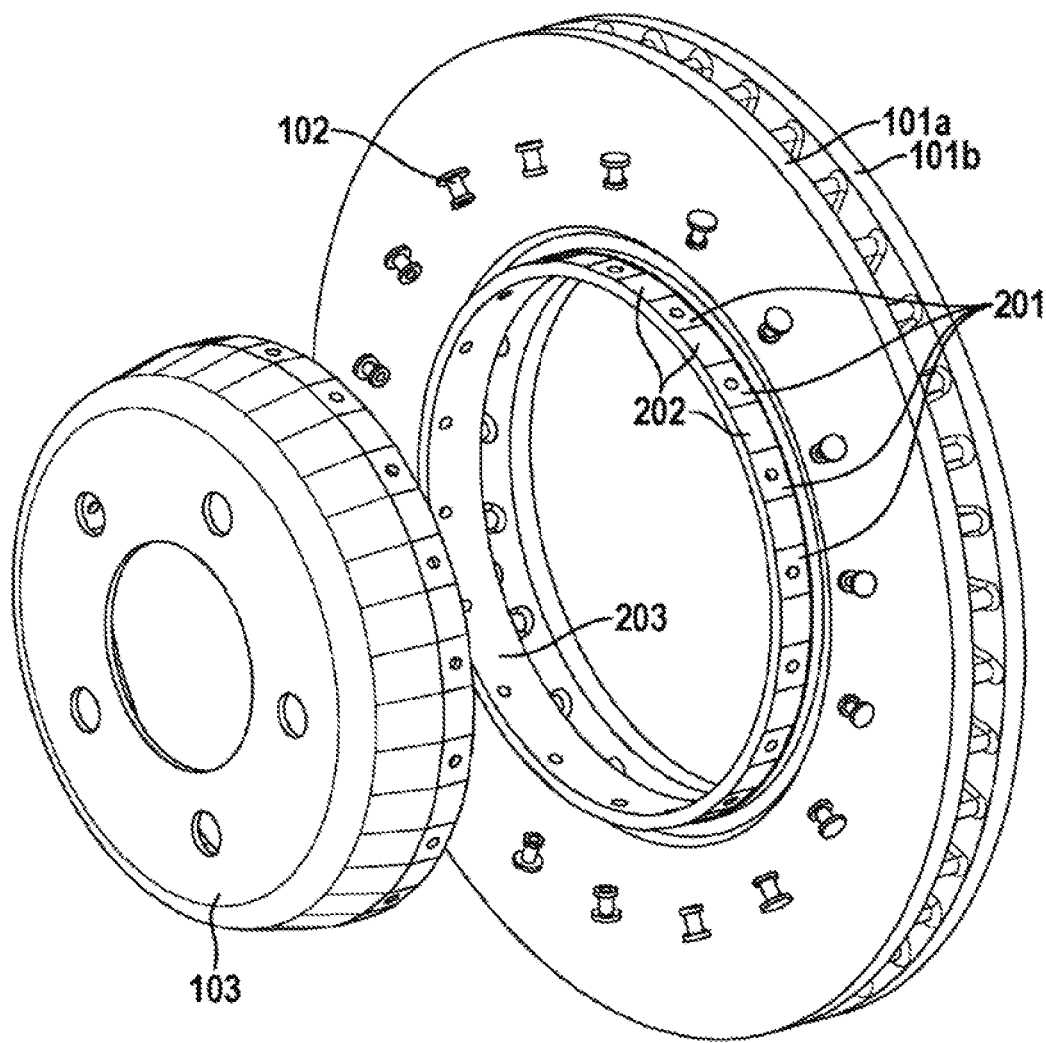
FIG. 2 shows a brake disk of lightweight construction before assembly according to the disclosure.

FIG. 2 shows the brake disk illustrated in FIG. 1 before the connection of the brake pot 103 to the brake disk 101a/b.

A collar 203 having the outer surfaces 201 and 202 is attached in an axially symmetrical manner to the brake disk 101a/b. The connecting elements 102 are illustrated above their associated holes in the collar 201 and 202.

For connection between the brake pot 103 and the brake disk 101a/b, holes provided in the outer rim of the brake pot 103 are brought into overlap with the mentioned holes in the collar. The connection means, which are here provided as rivets 201, can then be attached.

In this case, both the collar and the outer rim of the brake pot 103 have bent, curved and/or circular-arc-shaped surfaces 201 and 202. These bent, curved and/or circular-arc-shaped surfaces 201 and 202 substantially follow the shape predetermined by the round aperture 104.

Figure 3:
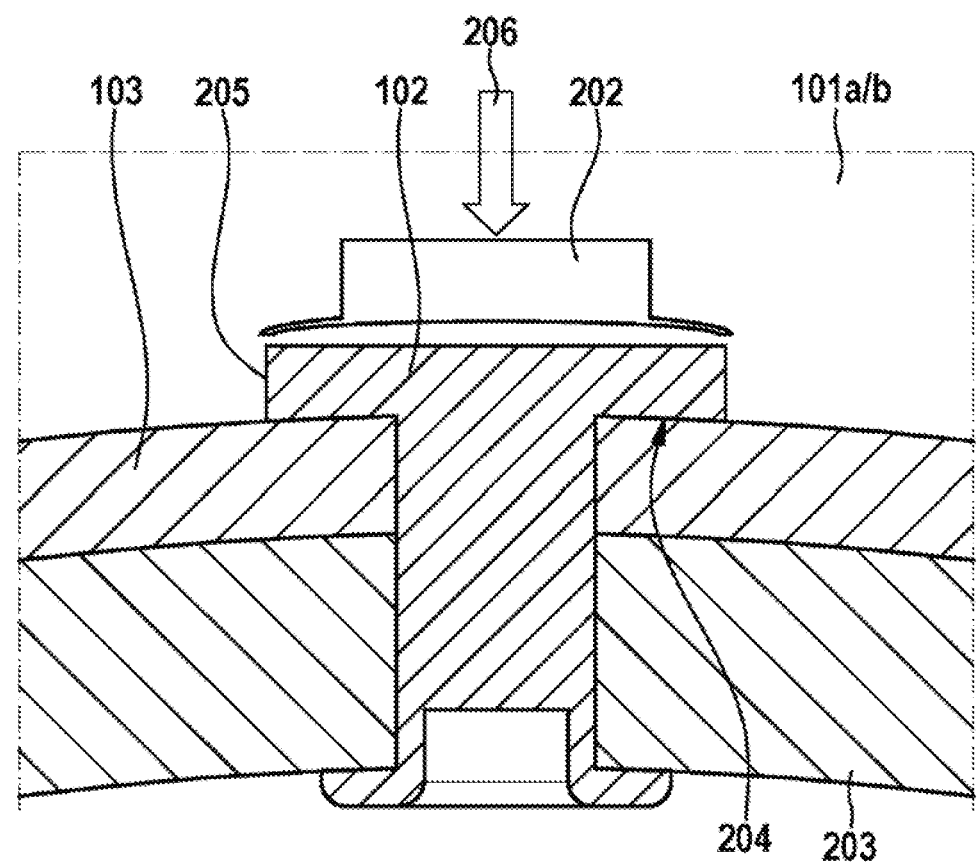
FIG. 3 shows a fully assembled brake disk of lightweight construction according to the disclosure in section.

FIG. 3 shows a fully assembled brake disk of lightweight construction according to the disclosure in section (plan view of the friction surface of the friction ring). It can be seen that the rivet 102, more specifically the rivet head, is worked by means of the tool 202 with the curved contact surface in the direction of the rivet head such that the rivet head 205 rests flatly against that surface 204 of the brake pot 103 which faces away from the collar 203. This is achieved in that, by means of the tool 202, the rivet head 205 is subjected to a greater force 206 at its rim than in its center.

Figure 4:
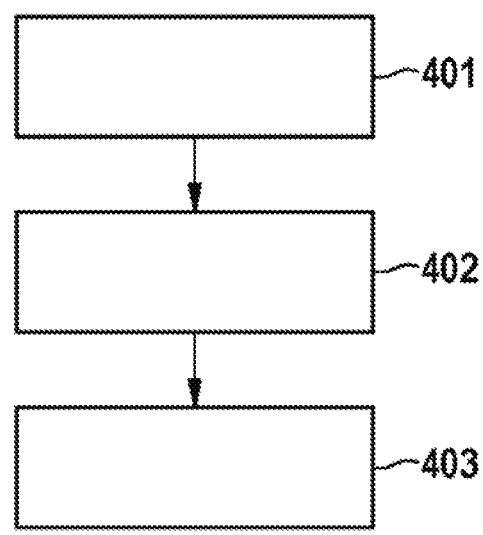
FIG. 4 shows the production method according to the disclosure.

The method for producing the brake disk according to the disclosure will now be discussed on the basis of FIG. 4.

In step 401, at least one friction ring 101a/b is made available.

In step 402, the brake pot 103 is made available.#

In step 403, the collar 201, 202 is connected to a rim, which is oriented toward the friction ring 101a/b, of the brake pot 103 by means of at least one connecting element 102 designed as a rivet. Here, the connection takes place such that the rivet head 205 is subjected to a greater force 206 at its rim than in its center.

The invention claimed is:

1. A brake disk comprising:
a friction ring formed at least partially of a first material, the friction ring having a planar surface and a collar formed in an axial direction; and
a brake pot formed at least partially of a second material that is different from the first material, the brake pot including a rim oriented toward the friction ring,
wherein the collar is connected to the rim by at least one connecting element configured as a rivet,
wherein the rivet defines a longitudinal axis parallel to the planar surface, and
wherein the rivet includes a rivet head resting flatly against a surface of the brake pot facing away from the collar.

2. The brake disk as claimed in claim 1, wherein the second material is a light metal.

3. The brake disk as claimed in claim 2, wherein the second material is aluminum.

4. The brake disk as claimed in claim 1, wherein the second material is a metal.

5. The brake disk as claimed in claim 4, wherein the second material is sheet metal.

6. The brake disk as claimed in claim 1, wherein the first material is gray cast iron.

7. The brake disk as claimed in claim 1, wherein the collar formed integrally on the friction ring.

8. The brake disk as claim in claim 1, wherein the surface of the brake pot facing away from the collar is a curved surface.

9. The brake disk as claim in claim 1, wherein no portion of the rivet is coplanar with the planar surface.

10. A method for producing a brake disk having a friction ring formed at least partially of a first material and having a planar surface and a collar formed in an axial direction, and a brake pot formed at least partially of a second material that is different from the first material, the method comprising:
connecting the collar to a rim, which is oriented toward the friction ring, of the brake pot with at least one connecting element configured as a rivet, such that a rivet head of the rivet is at least temporarily subjected to a greater substantially perpendicularly acting force at a rivet head rim of the rivet head than in a center of the rivet head, and such that a longitudinal axis of the rivet is parallel to the planar surface.

11. The method as claimed in claim 10, wherein the second material is a light metal.

12. The method as claimed in claim 11, wherein the second material is aluminum.

13. The method as claimed in claim 10, wherein the material is a metal.

14. The method as claimed in claim 13, wherein the second material is sheet metal.

15. The method as claimed in claim 10, wherein the connecting of the collar to the rim includes contacting the rivet head with a rounded surface of a tool.

16. The method as claimed in claim 10, wherein the first material is gray cast iron.

17. The method as claimed in claim 10, wherein connecting the collar to the rim comprises inserting the rivet through a curved surface of the rim.

18. The method as claimed in claim 10, wherein connecting the collar to the rim, comprises connecting the collar to the rim with the rivet such that no portion of the rivet is coplanar with the planar surface.

* * * * *